United States Patent
Malcolm

(10) Patent No.: US 7,552,088 B2
(45) Date of Patent: Jun. 23, 2009

(54) PERSONALLY CUSTOMIZABLE CREDIT CARD ACCOUNTS

(75) Inventor: Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 11/062,421

(22) Filed: Feb. 22, 2005

(65) Prior Publication Data

US 2005/0144123 A1 Jun. 30, 2005

Related U.S. Application Data

(62) Division of application No. 09/676,573, filed on Oct. 2, 2000, now abandoned.

(51) Int. Cl.
*G06Q 40/00* (2006.01)
(52) U.S. Cl. ......................... 705/39; 705/38
(58) Field of Classification Search ................... 705/35, 705/39, 35.38
See application file for complete search history.

(56) References Cited

U.S. PATENT DOCUMENTS

| | | | | |
|---|---|---|---|---|
| 4,837,422 A | 6/1989 | Dethloff et al. | ............. | 235/380 |
| 5,350,906 A | 9/1994 | Brody et al. | ................ | 235/379 |
| 5,815,657 A * | 9/1998 | Williams et al. | ............... | 705/1 |
| 5,864,830 A | 1/1999 | Armetta et al. | ................ | 705/41 |
| 5,883,810 A | 3/1999 | Franklin et al. | ......... | 364/479.02 |
| 5,953,710 A | 9/1999 | Fleming | ....................... | 705/38 |
| 5,961,593 A | 10/1999 | Gabber et al. | ............... | 709/219 |
| 5,984,180 A | 11/1999 | Albrecht | ...................... | 235/380 |
| 6,422,462 B1 * | 7/2002 | Cohen | ......................... | 235/381 |
| 7,337,144 B1 * | 2/2008 | Blinn et al. | ................... | 705/40 |
| 2001/0032192 A1* | 10/2001 | Putta et al. | ..................... | 705/76 |
| 2001/0047336 A1* | 11/2001 | Maycock et al. | .............. | 705/44 |

FOREIGN PATENT DOCUMENTS

WO    WO 99/49424    9/1999

OTHER PUBLICATIONS

IBM Technical Disclosure Bulletin, *Automatic Banking Machine Dispenses Machine-Readable Documents*, May 1981, vol. 23, No. 12, p. 5305.

* cited by examiner

*Primary Examiner*—Jagdish N Patel
(74) *Attorney, Agent, or Firm*—Dillon & Yudell LLP

(57) ABSTRACT

Account holders may specify vendor-specific charge restrictions for charging transactions against their accounts, where each vendor-specific charge restriction includes a unique identifier for the corresponding vendor to which the charge restriction is applicable. When a charge authorization request is received for a charge against an account having vendor-specific charge restrictions set by the account holder, the vendor identifier is extracted from the charge authorization request and employed to determine whether any charge restrictions are applicable to the requesting vendor.

1 Claim, 3 Drawing Sheets

PERSONALLY CUSTOMIZABLE CREDIT CARD ACCOUNTS

This is Divisional of application Ser. No. 09/676,573, filed Oct. 2, 2000, and titled PERSONALLY CUSTOMIZEABLE CREDIT CARD ACCOUNTS, now abandoned.

BACKGROUND OF THE INVENTION

1. Technical Field

The present invention generally relates to charge accounts and in particular to security of and control over charge account use. Still more particularly, the present invention relates to account holder control over charge authorizations using charge account numbers.

2. Description of the Related Art

A major obstacle to broad public acceptance and use of e-business is reluctance of consumers to reveal their credit or debit card numbers over the Internet due to security concerns, both real and perceived. One fear is interception of the card number by a third party, although secure socket layer (SSL) encryption employed in secure Internet transactions renders such interception extremely improbable. However, the perception on the part of account holders remains.

Another concern, one having much more basis in reality, involves automatic renewal and rebilling by an enterprise upon expiration of a membership subscription. Although reputable businesses offer procedures to cancel membership subscriptions, the risk of either a potential argument over cancellation or an error or delay in cancellation, while rebilling continues, is enough to prevent some consumers from even considering using their charge accounts on the Internet.

Various methods have been employed or proposed for improving security and reducing the risk of unauthorized rebilling in charge account use. "Single use" charge account numbers, for example, employ numbers associated with an account which are only valid for a single charging activity. After the account number has been used once, charging authorization on that account number is denied for all subsequent charge requests. This approach, however, places a tremendous burden on the existing credit card numbering scheme since only a finite range of unique numbers exists. Single use account numbers would quickly run through the entire range of permutations. Much larger ranges of numbers than are currently employed would be required for this solution to be practical.

An alternative solution involves adding prefixes or suffixes to existing account numbers to create single use account numbers for that account. However, this requires a larger number of digits for account numbers than are currently employed (typically sixteen) to uniquely identify an account, which would cause much existing software depending on the current number of digits within account numbers to function improperly. Moreover, while single use account charging activity is desirable in some situations, modification of all charging activity to involve single use account numbers is not desirable for many types of transactions.

It would be desirable, therefore, to enable an account holder to establish single use charging functionality for an account in selected situations, while retaining the ability to generally employ unrestricted charging transactions in other situations. It would further be advantageous for the account holder to be able to establish such single use limitations either before or after the charging transaction.

SUMMARY OF THE INVENTION

It is therefore one object of the present invention to provide improved charge accounts.

It is another object of the present invention to provide improved security of and control over charge account use.

It is yet another object of the present invention to provide account holder control over charge authorizations using charge account numbers.

The foregoing objects are achieved as is now described. Account holders may specify vendor-specific charge restrictions for charging transactions against their accounts, where each vendor-specific charge restriction includes a unique identifier for the corresponding vendor to which the charge restriction is applicable. The charge restriction may be an exclusion from approval of all charge authorization requests, an amount limit on charge authorization requests which may be approved, a "rebill" limit on the number of times subsequent charge authorization requests may be approved, or a combination of such restrictions and/or other restrictions. When a charge authorization request is received for a charge against an account having vendor-specific charge restrictions set by the account holder, the vendor identifier is extracted from the charge authorization request and employed to determine whether any charge restrictions are applicable to the requesting vendor. The vendor-specific charge restrictions for a particular vendor may be specified by the account holder either before or after an initial charge transactions involving that vendor, with the vendor identifier either manually entered by the account holder or automatically extracted from an account transaction record.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
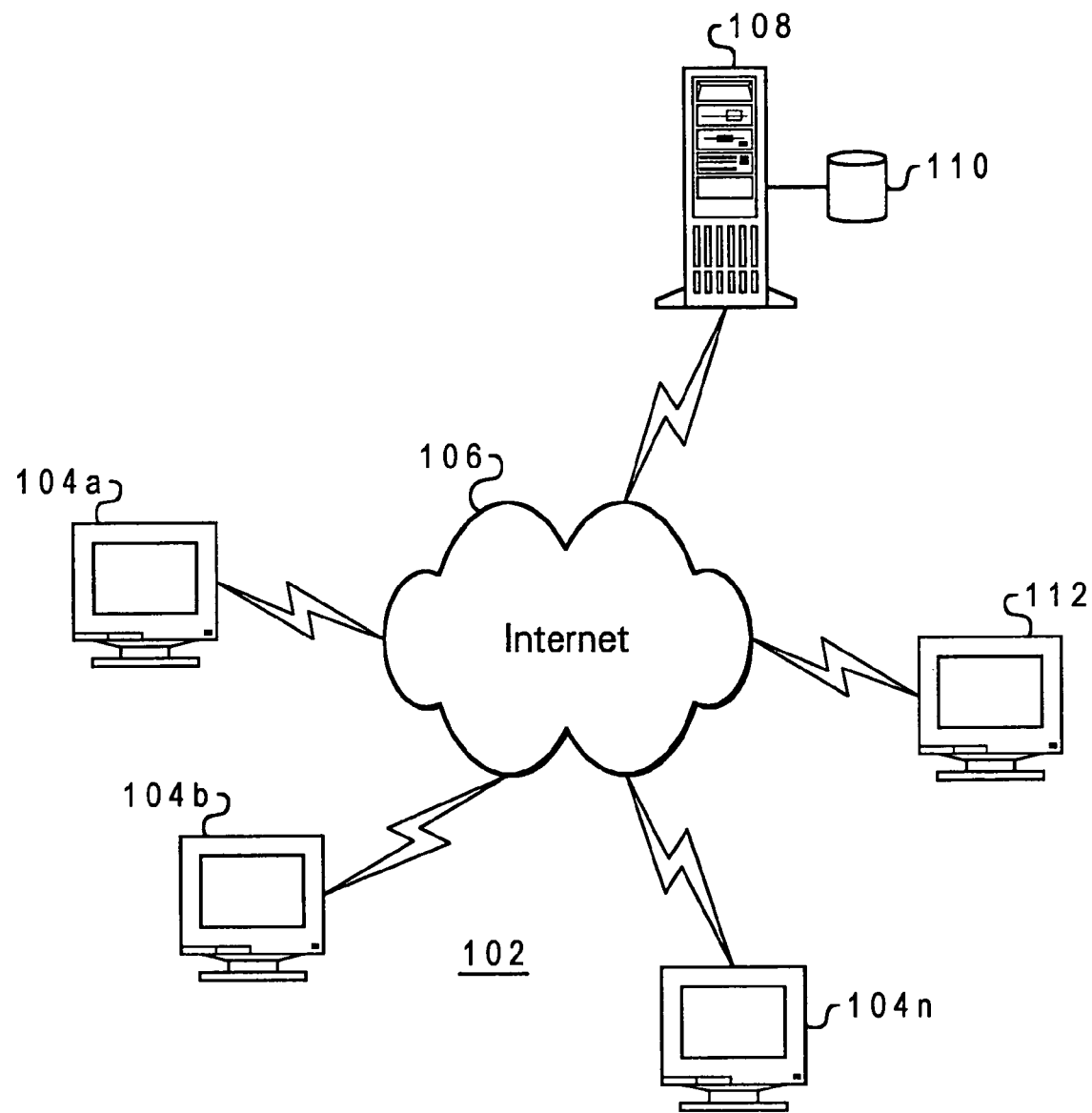
FIG. 1 depicts a high-level block diagram of a credit card authorization system, in which a preferred embodiment of the present invention may be implemented.

With reference now to the figures, and in particular with reference to FIG. 1, a high-level diagram of a charging transaction authorization system in accordance with a preferred embodiment of the present invention is depicted. System 102 includes a number of requesting units 104a-104n (where n is any integer) operating by vendor enterprises for the purposes of requesting charging transactions. As used herein, "charging transactions" and "charge account" refer to any transaction or account relating to payment by transfer of credit or funds through a third party account provider utilizing an account number, including without limitation credit card transactions and accounts, debit card transactions and accounts, "check card" transactions and checking accounts, and the like.

Requesting units 104a-104n are capable of generating charge authorization requests for transmission over the Internet 106 to a charge authorization server 108 or similar charge authorization clearing facility. Charge authorization server 108 maintains a database 110 containing information regarding charge accounts which may be accessed utilizing the charge account number, including available credit or deposit balance for the account. Database 110 also includes vendor-specific charge restrictions specified by the account holder, described in further detail below. A user unit 112, connected to charge authorization server 108 via Internet 106, allows account holders to set or change vendor-specific charge restrictions for their account(s) Charge authorization server 108 provides an interface allowing account holders to apply such vendor-specific charge restrictions to their account information within database 110.

Charge authorization requests transmitted by any of requesting units 104a-104n and received by charge authorization server 108 are processed by charge authorization server 108 utilizing the account information associated with the charge account number within the charge authorization request. The charge authorization requests also contain vendor identification information, which includes a unique vendor identifier for the vendor requesting the charge authorization and may optionally include the vendor name. Charge authorization server 108 employs the vendor identifier and/or name in processing charge authorization requests utilizing account information within database 110. Other information, such as an identification of the account to be credited by the charge authorization, may also be contained within charge authorization requests in accordance with the known art.

Although the exemplary embodiment depicts transactions being performed over the Internet 106, some or all of the transactions described above may occur between data processing systems having direct communications, such as requesting units which directly dial-up the charge authorization server over a telephone connection.

Figure 2:
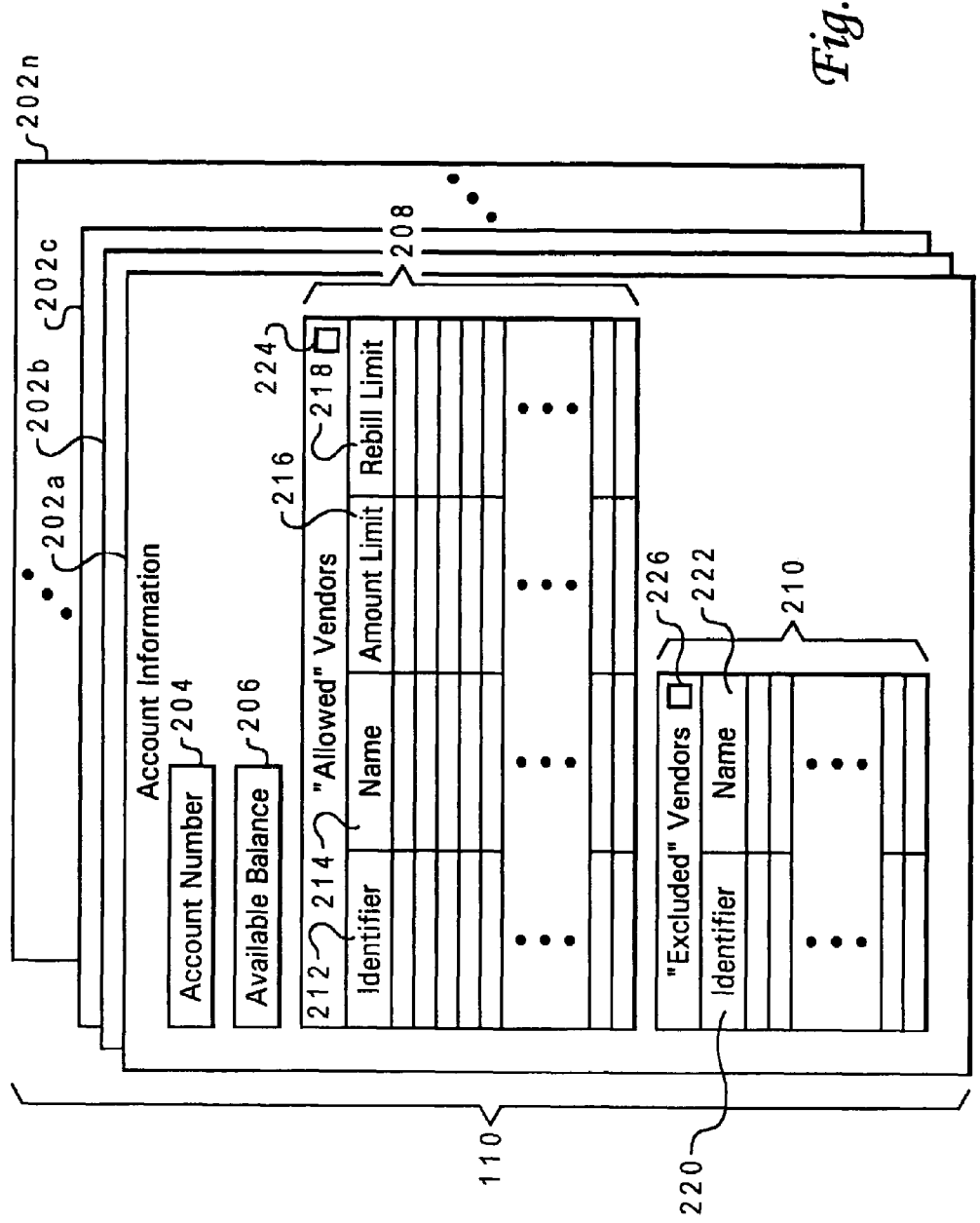
FIG. 2 a block diagram of charge account information including vendor-specific charge restrictions specified by the charge account holder in accordance with a preferred embodiment of the present invention.

Referring to FIG. 2, which is intended to be read in conjunction with FIG. 1, a block diagram of charge account information including vendor-specific charge restrictions specified by the charge account holder in accordance with a preferred embodiment of the present invention is illustrated. Database 110 contains a plurality of charge account records 202a-202n for different charge accounts (which may include checking accounts), each identified by a unique charge account number. Each charge account record 202a-202n contains the charge account number 204, together with a current available balance or credit amount 206.

Each charge account record 202a-202n also includes a listing of "allowed" vendors 208, "excluded" vendors 210, or both. Allowed and excluded vendors listings 208 and 210 are specified by the account holder and are employed in processing charge authorization requests. Charge authorization requests which would violate the restrictions specified by the account holder within allowed and excluded vendors listings 208 and 210 are declined; charge authorization requests which would not violate the restrictions specified by the account holder may be approved.

Allowed vendors listing 208 contains an entry for each vendor specified by the account holder, where each entry includes a unique (typically numeric or alphanumeric) identifier 212 for the vendor, and may also contain the vendor's name 214. Each entry within allowed vendors listing 208 may also contain an amount limit 216 specified by the account holder, designating an amount limit for each charge which may be approved for that vendor. The amount limit 216 may be undefined to allow approval of any amount, or may be a finite dollar amount, and may also have a default value.

While the amount limit 216 could be simply a per-charge limit for the corresponding vendor, such a limitation would allow a number of smaller charges to be pushed through. Instead, amount limit 216 should preferably be a time-based limit (e.g., $100 per month). In this manner, no consideration is given to whether the charges by the vendor are a single charge for the full amount, or a number of smaller charges. Charges in excess of the specified amount limit 216 during the corresponding period will be declined.

Each entry within allowed vendors listing 208 may also have a "rebill" limit 218, which specifies either an absolute number of subsequent charge authorizations which may be approved for the corresponding vendor or a number of billing periods during which charge authorization may be approved up to the amount limit 216. After charge authorization requests for the specified number of billings or billing periods have been approved, subsequent charge authorization requests will be declined. In this manner, the number of rebillings by a particular vendor may be controlled by the account holder. Rebill limit 218 and amount (per billing period) limit 216 combine to provide control over both the amount and the duration of charges by a particular vendor (e.g., $100 per month for 12 months).

Excluded vendors listing 210 similarly contains an entry for each vendor specified by the account holder to be subject to special charge restrictions, with each entry containing a unique identifier 220 for the vendor and, optionally, the vendor's name 222. Charge authorization requests from vendors identified within excluded vendors listing 210 will always be declined.

Allowed and excluded vendors listings 208 and 210 each include a flag, a decline-all-others flag 224 within allowed vendors listing 208 and an approve-all-others flag 226 within excluded vendors listing 210. Decline-all-others flag 224, when set, causes all charge authorization requests from any vendors not specifically identified within the approved vendors listing 208 to be declined. Approve-all-others flag 226, when set, causes all charge authorization requests from any vendors not identified within the excluded vendors listing 210 to be approved, subject to amount and rebill limitations (if any) set in approved vendors listing 208. Decline-all-others flag 224 and approve-all-others flag 226 should be mutually exclusive, and should not both be set at the same time.

Vendors may be added to either allowed and excluded vendors listings 208 and 210 by an account holder either through manual entry of vendor information, or by selection of a transaction within account records and automatic extraction of vendor information (vendor identifier and name) from the account transaction records. A dictionary of vendor identifiers indexed by vendor name may be provided to the account holder for adding vendors to listings 208 and 210. In this manner, vendor-specific charge restrictions, including charge amount and rebilling limits, may be specified by the account holder either before or after an initial charge transaction.

Referring back to FIG. 1, the account holder employs user unit 112 to set or change vendors within the allowed and excluded vendors listings for their account information within database 110. Requesting units 104a-104n generate and transmit charge authorization requests relating to the account holder's account, which are received by charge authorization server 108 and processed for approval utilizing the account information within database 110. If a restriction set by the account holder within the allowed and excluded vendors listings would be violated by a received charge authorization request, the charge authorization request is declined in the response generated by charge authorization server 108. If a received charge authorization request would not violate account holder restrictions, the charge authorization request may be approved, subject to other limitations such as available balance.

Figure 3:
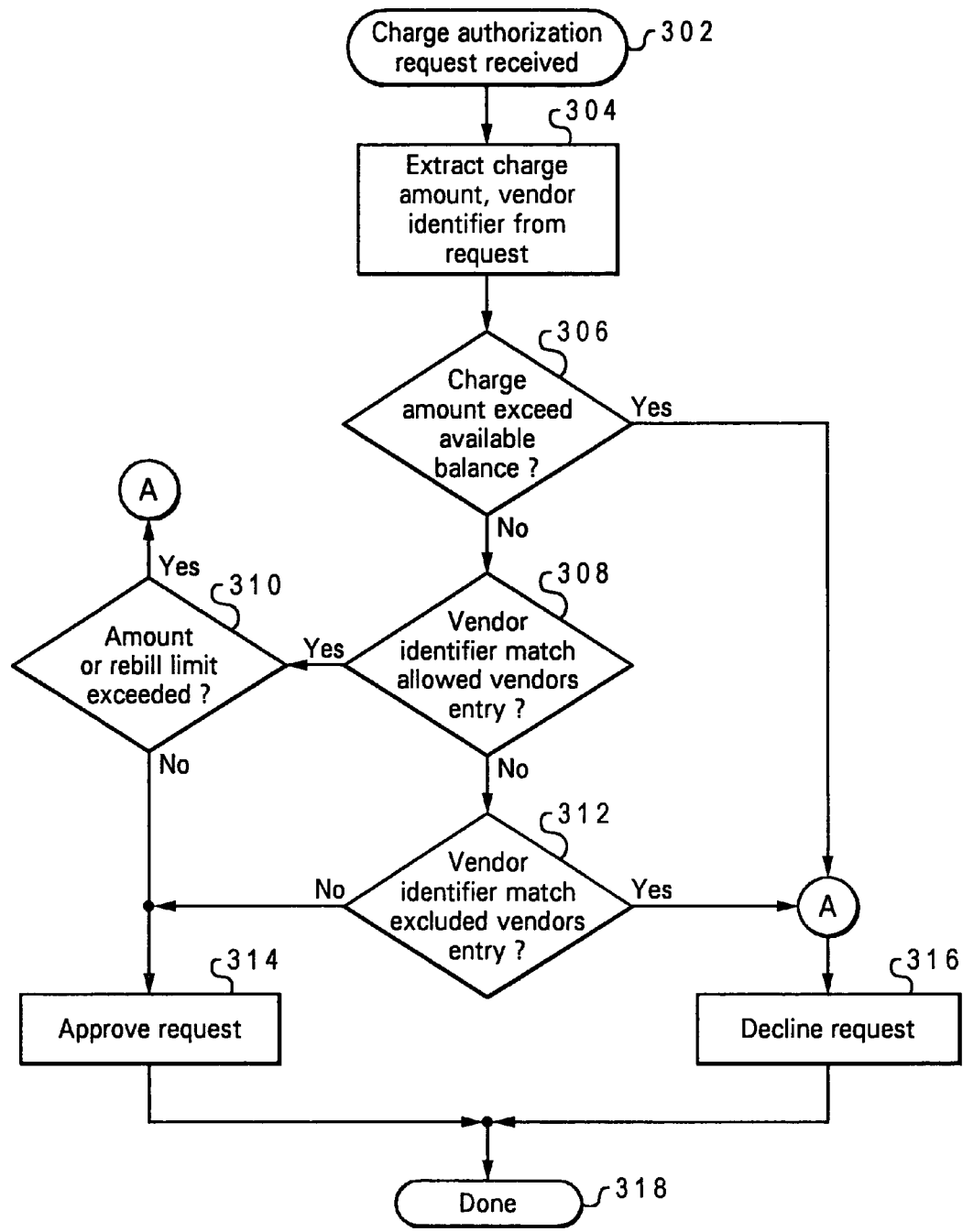
FIG. 3 depicts a high level flow chart for a process of processing charge authorization requests utilizing vendor-specific charge restrictions specified by the charge account holder in accordance with a preferred embodiment of the present invention.

With reference now to FIG. 3, a high level flow chart for a process of processing charge authorization requests utilizing vendor-specific charge restrictions specified by the charge account holder in accordance with a preferred embodiment of the present invention is depicted. The process begins at step 302, which depicts receiving a charge authorization requests including a vendor identifier and a charge amount (together with a unique charge account number) at a charge authorization server. The process first passes to step 304, which illustrates extracting the charge amount, the vendor identifier, and the charge account number from the charge authorization request.

The process next passes to step 306, which depicts a determination of whether the charge amount exceeds an available credit limit or account balance for the account identified by the account number within the charge authorization request. If not, the process proceeds to step 308, which illustrates a determination of whether the vendor identifier from the charge authorization request matches a vendor identifier within an allowed vendors listing associated with the subject account. If so, the process proceeds to step 310, which depicts a determination of whether an amount limit or a rebill limit specified by the account holder for the identified vendor would be exceeded by the requested charge to the account.

If a specified amount or rebill limit would be exceeded, the process proceeds to step 316, which illustrates declining the charge authorization request; if specified amount or rebill limits would not be exceeded (or if none are specified), the process proceeds instead to step 314, which depicts approving the charge authorization request.

Referring back to step 308, if the vendor identifier from the charge authorization request does not match any entry within the allowed vendors list associated with the account to be charged, the process proceeds instead to step 312, which illustrates a determination of whether the vendor identifier matches a vendor identifier within any entry in an excluded vendors listing associated with the account. If so, the process proceeds to step 316, which illustrates declining the charge authorization request; if not, the process proceeds instead to step 314, which depicts approving the charge authorization request. From either of step 314 or 316, the process then proceeds to step 318, which depicts the process becoming idle until another charge authorization request is received.

The exemplary process of FIG. 3 is a simplistic example subject to myriad variations within the spirit and scope of the present invention. For example, the determination of whether vendor-specific charge restrictions (steps 308 and 310) have been specified by an account holder for the requesting vendor may be performed before the charge amount is compared to the available credit or account balance for the account. Moreover, additional steps may be performed to check the state of exclude-all-others and allow-all-others flags as described above before approving or declining a charge authorization request.

The present invention improves the security of employing charge accounts by permitting vendor-specific charge restrictions by the account holder. The account holder can thus achieve "single use" charging with respect to a particular vendor by setting charge restrictions for that vendor, either before or after the charging transaction. Amount limits may be specified by the account holder for budgeting purposes, and rebill limits may be specified by the account holder to avoid billing disputes.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for managing charging transactions, comprising:

receiving, within a data processing system, from an owner of a chargeable account number and in association with the chargeable account number, a designation of at least one specified vendor as a member of an allowed vendors listing, said designation including a corresponding amount limit chargeable by the specified vendor, said corresponding amount limit being a specified amount within a defined duration of time, said allowed vendor listing having associated therewith a decline all others flag, wherein if said decline all others flag is set, charging authorization requests from vendors not listed in said allowed vendors listing are declined;

identifying each vendor in the allowed vendor listing with a vendor specific identification;

storing the designated specified vendor member of the allowed vendor listing and corresponding amount limit including the duration of time in association with the associated vendor identification in a database associated with the data processing system;

receiving, within the data processing system, from the owner of the chargeable account number and in association with the chargeable account number, a designation of at least one specified excluded vendor as a member of an excluded vendor listing;

identifying each vendor in the excluded vendor listing with a vendor specific identification;

storing vendor identification of the at least one specified excluded vendor in the database associated with the data processing system;

receiving, at the data processing system, from a requesting vendor a current charging transaction authorization request associated with the chargeable account number, said current charging transaction authorization request including an identification of a vendor requesting the authorization, an amount of a charge, and a time of the transaction;

comparing the current charging transaction information with the allowed vendor listing and excluded vendor information stored in the database;

determining whether the decline all others flag associated with the allowed vendors listing is set;

determining whether the requesting vendor for the current charging transaction is identified on the allowed vendors listing;

if the charging vendor is not on the allowed vendors listing and if the decline all others flag is set, declining the current charging transaction;

if the charging vendor is not on the allowed vendors listing, determining if the charging vendor is on the excluded vendors listing;

if the charging vendor is on the excluded vendors listing, declining the current charging transaction;

if the charging vendor is on the allowed vendors listing, determining, by the data processing system, whether the current charging transaction for a specified amount by the charging vendor to the chargeable account number is within the designated amount limit chargeable by the charging vendor within the defined duration of time; and, if the current charging transaction for a specified amount by the charging vendor to the chargeable account number is within the designated amount limit chargeable by the charging vendor within the defined duration of time, approving the current charging transaction.

* * * * *